Jan. 11, 1966 W. J. STEIN ETAL 3,228,464
CORRUGATED PLATE COUNTER FLOW HEAT EXCHANGER
Filed Aug. 9, 1963 5 Sheets-Sheet 2
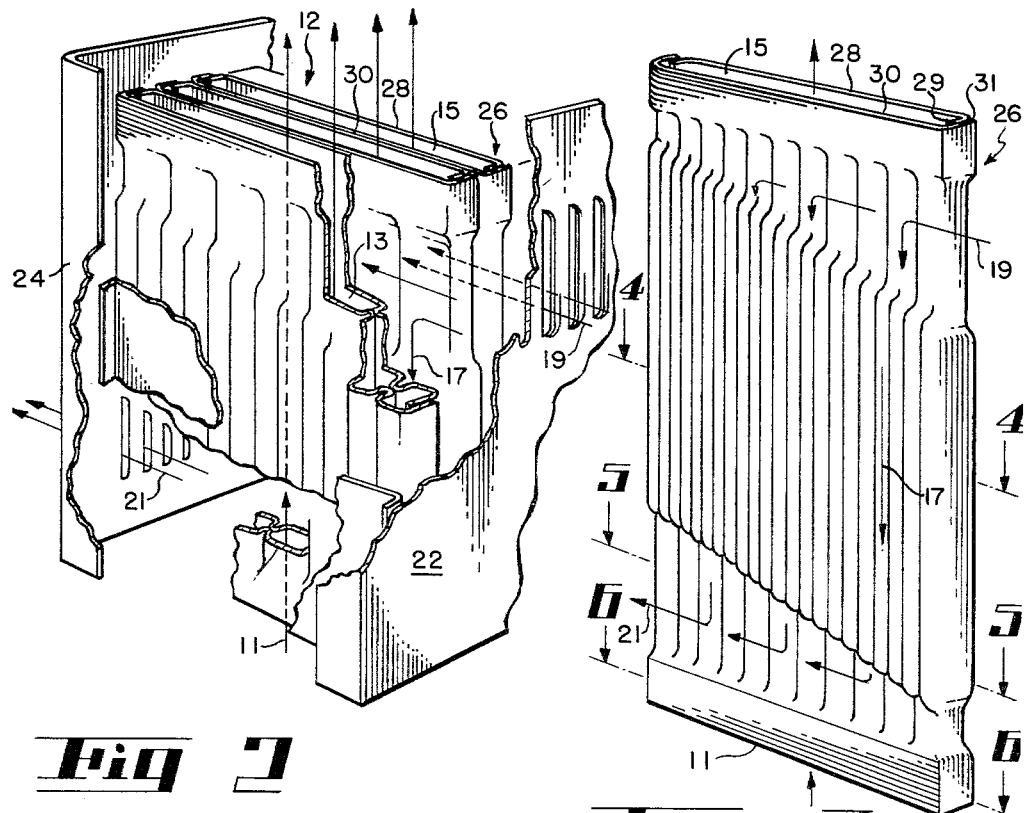
Fig 2
Fig 3
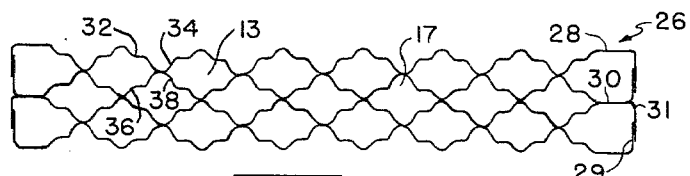
Fig 4
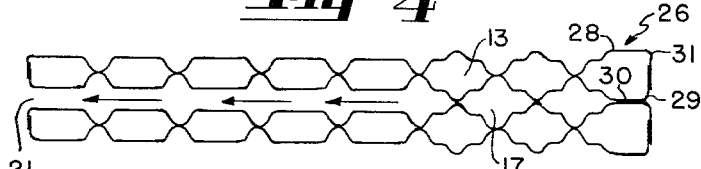
Fig 5
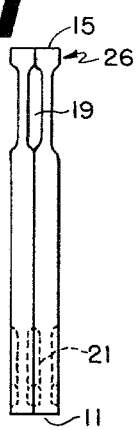
Fig 7
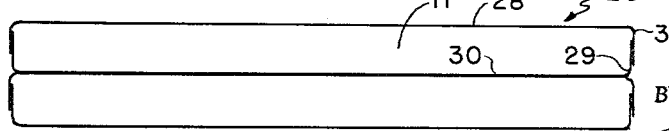
Fig 6
INVENTORS.
WOLFGANG J. STEIN
BY CLIFFORD R. BANTHIN
ATTORNEYS.

Jan. 11, 1966   W. J. STEIN ETAL   3,228,464
CORRUGATED PLATE COUNTER FLOW HEAT EXCHANGER
Filed Aug. 9, 1963   5 Sheets-Sheet 4

INVENTORS.
WOLFGANG J. STEIN
CLIFFORD R. BANTHIN
BY
ATTORNEYS.

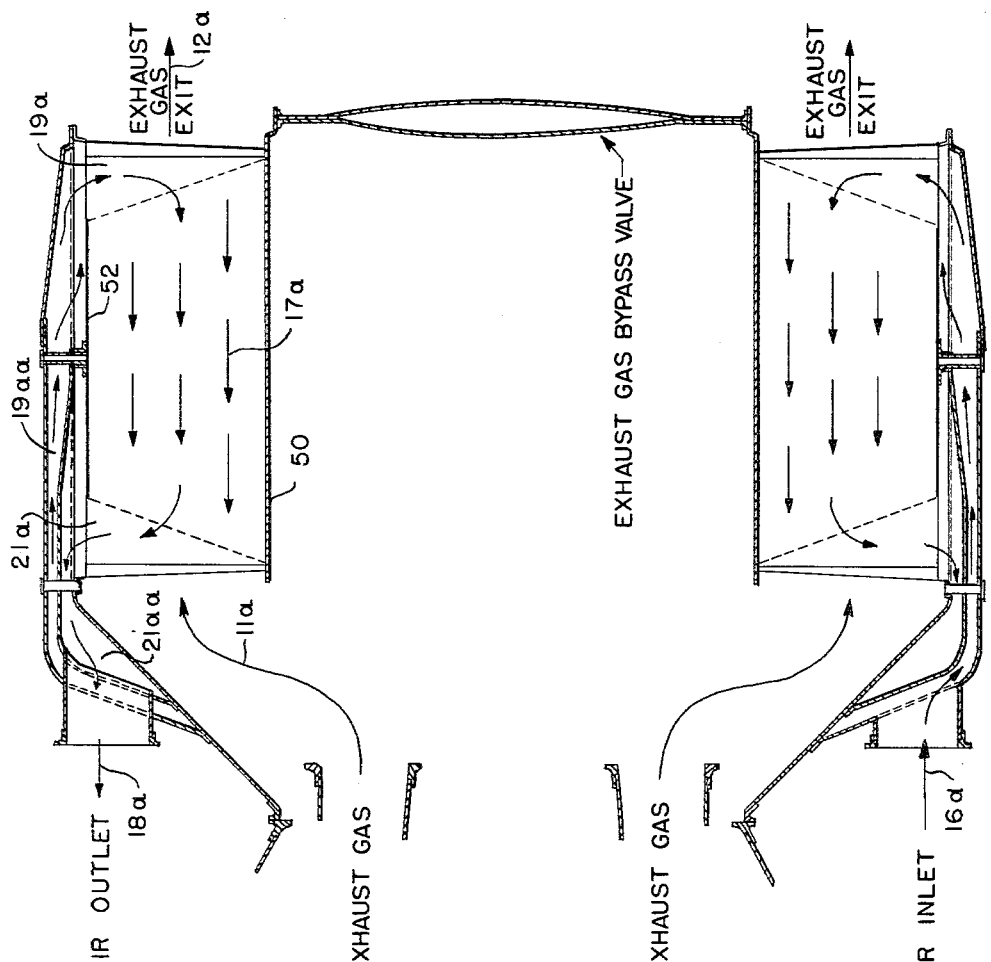

United States Patent Office 3,228,464
Patented Jan. 11, 1966

1

3,228,464
CORRUGATED PLATE COUNTER FLOW
HEAT EXCHANGER
Wolfgang J. Stein, Milford, and Clifford R. Banthin, Redding, Conn., assignors to Avco Corporation, Stratford, Conn., a corporation of Delaware
Filed Aug. 9, 1963, Ser. No. 301,152
5 Claims. (Cl. 165—166)

This invention relates to a corrugated plate counter flow heat exchanger of a type made up of a series of stacked waved plates, so formed as to provide compact close relationship between flow channels carrying primary and secondary fluid flow for the purpose of transferring heat therebetween while maintaining positive separation of such primary and secondary flow.

The structure disclosed results in improvement in a number of important features, among them being:

(1) Single plate thickness of surfaces between primary and secondary flow channels;

(2) Direction of the primary flow channels parallel to the secondary flow channels in a major portion of the heat exchange region, with transverse flow limited to the region of inlet and outlet of the secondary flow region;

(3) A close positioning of the primary and secondary flow channels by the use of a stacked plurality of pairs of opposed waved plates with only two variants (in the preferred form) in plate design;

(4) The provision of a large number of tubelike passages of small hydraulic diameter, achieving many tubelike passages with a single pair of plates;

(5) Each pair of opposed plates providing a stacking element with a minimum number of parts of different design;

(6) Smooth entrances and exits to the passages;

(7) Plates sealed at sides and ends as an integral unit by folding and/or forming edges prior to welding or brazing, with all other separation between primary and secondary flow regions independent of joints or sealing of parts, primary separation being effected by plate thickness.

It is a primary object of this invention to provide a heat exchanger with a close relationship between primary and secondary flow passages for heat transfer therebetween, with flow in said passages substantially counter to each other over a major region of primary and secondary flow.

It is another object to provide primary and secondary flow passages for heat transfer relationship in a stacked series of plates with substantially straight and counter primary flow passages adjacent secondary passages employing a relatively short crossflow inlet followed by longitudinal flow passages parallel to said primary flow passages followed by a crossflow of limited extent at an outlet.

It is another object to provide a waved plate heat exchanger made up of a series of stacked waved plates affording primary and secondary flow passages with substantially parallel wave formations stacked in a plurality of pairs, each pair positioned together with inwardly projecting wave crests contacting to form longitudinally-extending primary flow passages with inward projections on each plate of said pair located at the edges, thereby to contain a primary flow between plates without necessity for primary reliance on the contacting wave crests for dividing primary flow from secondary flow.

It is another object of this invention to provide a plurality of substantially parallel primary flow passages made up from a series of oppositely-disposed waved plates with their crests contacting, thereby to form said longitudinally-extending flow channels and to secure said plates together at the edges parallel to said flow channels and to stack said pairs together with their projecting wave crests on the outside of said pairs forming secondary channels.

It is a further object to provide inlet and outlet for said secondary flow by providing spaced regions of projecting wave crests having lesser depth on opposite sides of a central counterflow region of projecting wave crests having greater depth.

It is another object to provide a waved plate type of heat exchanger formed of a series of stacked plates of minimum variations in design, which when stacked together provide positively-separated primary and secondary flow passages with positive separation between said primary and secondary flow without primary reliance upon connections between plates for separation between said primary and secondary flow, other than a connection at the edges of said plates.

The above and other objects of the invention will appear more fully from the following more detailed description of an illustrative embodiment of the invention and by reference to the accompanying drawings, forming a part hereof and wherein:

FIGURE 2 is a perspective view partly in section showing the arrangement of the primary and secondary flow and the stacked series of plates making up the heat exchange unit.

FIGURE 3 is a perspective view of a plate pair positioned together to form a part of the stacked unit.

FIGURE 4 is a section on the line 4—4 of FIGURE 3.

FIGURE 5 is a section on the line 5—5 of FIGURE 3.

FIGURE 6 is a section on the line 6—6 of FIGURE 3.

FIGURE 7 is an end view of FIGURE 4 showing two plate pairs positioned together.

FIGURES 8–11, inclusive, are similar to FIGURE 4 of the preferred form, but show modified forms of plate-stacking arrangements with modified forms of the waves in the plates.

Figure 13:
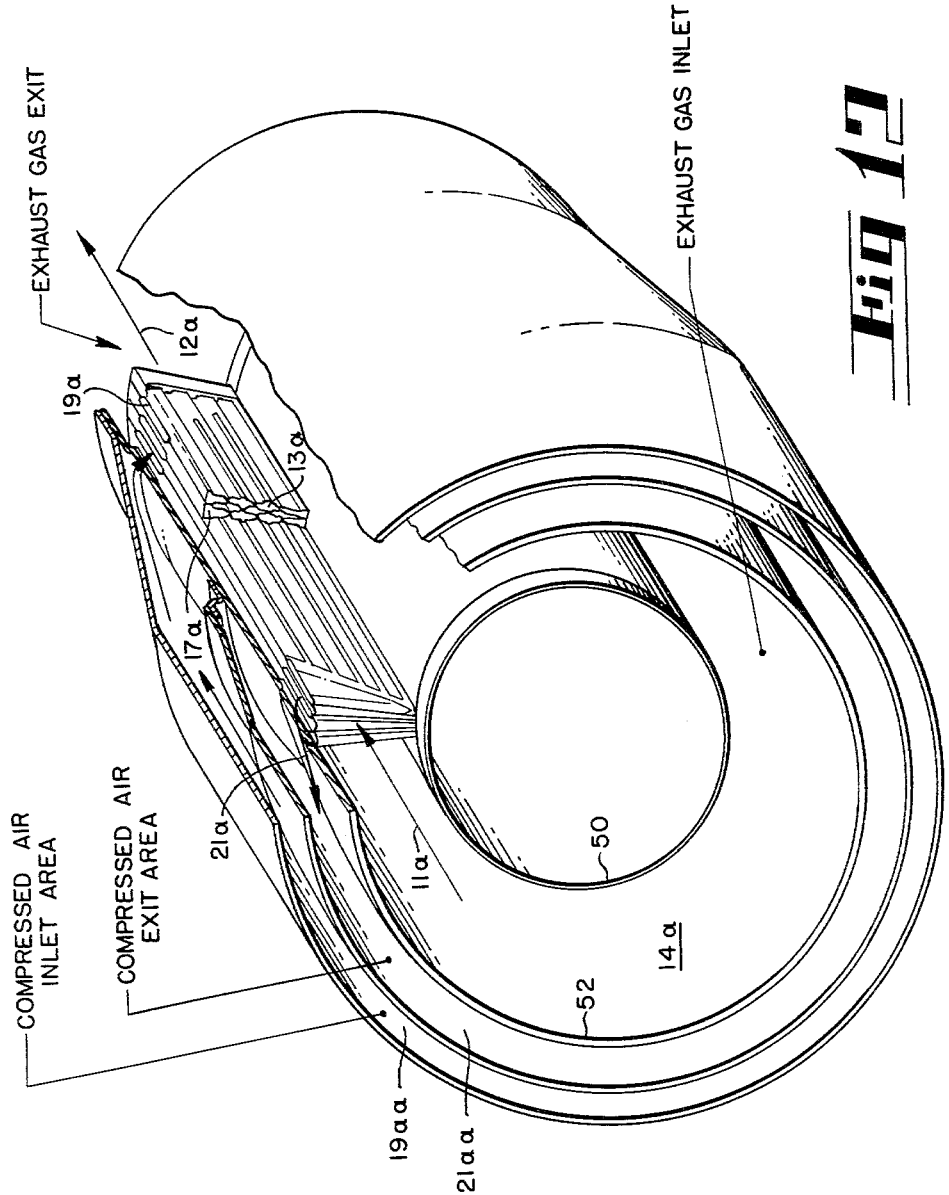

FIGURES 12 and 13 show a modified form of plate stacking, wherein the plates are stacked in an annular region in such manner that the exhaust gas-heating flow is straight through from a forward inlet to a rearward outlet.

Figure 1:
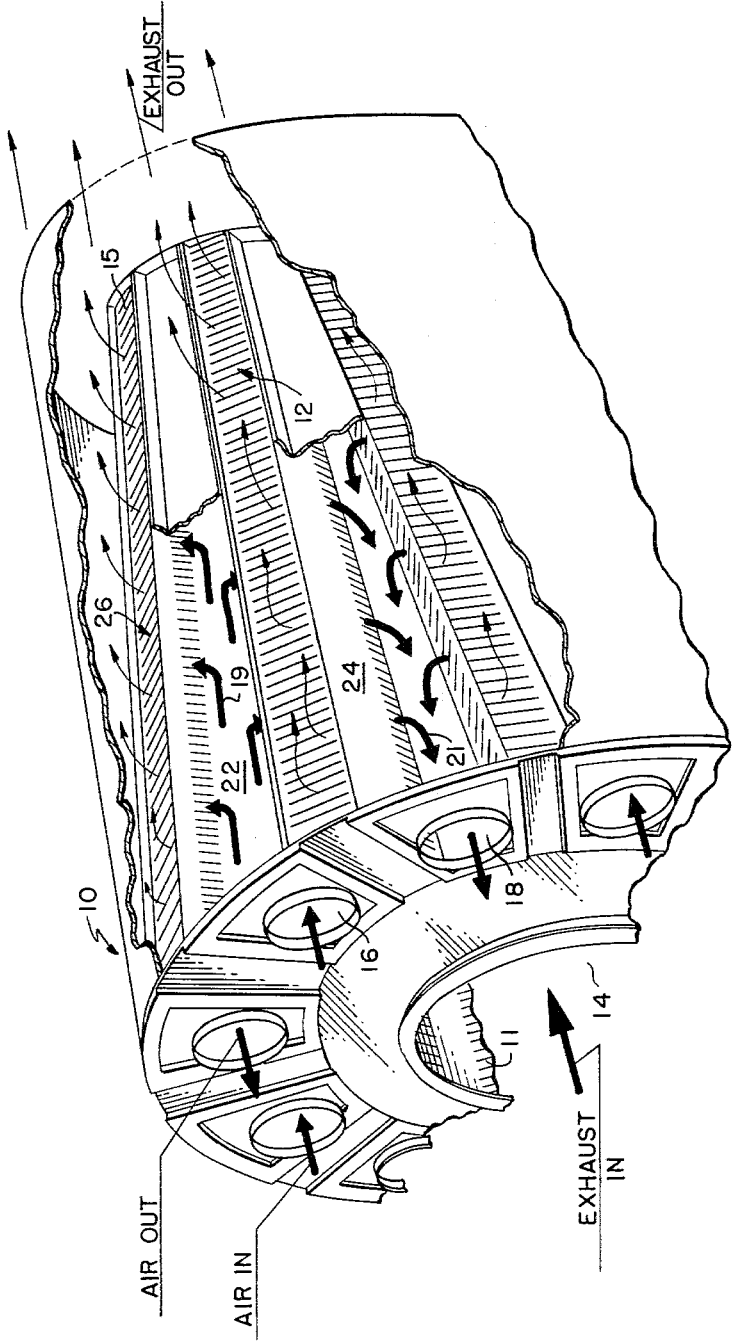
FIGURE 1 is a perspective view of an illustrative heat exchanger assembly employing the structure of this invention, particularly adapted for use as a heat exchanger employing exhaust gases for heating the air between the outlet at the compressor and the inlet to the combustion section of the engine.
Figure 8:
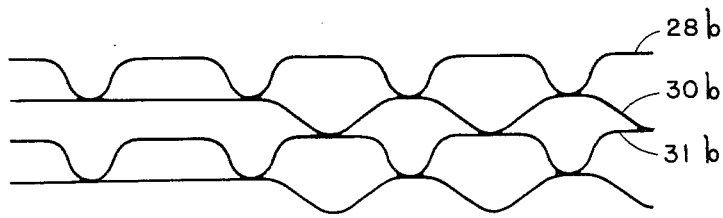
Figure 9:
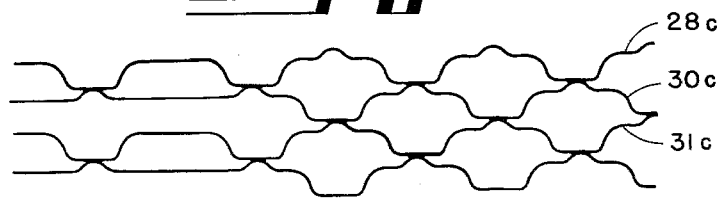
Figure 10:
Figure 11:
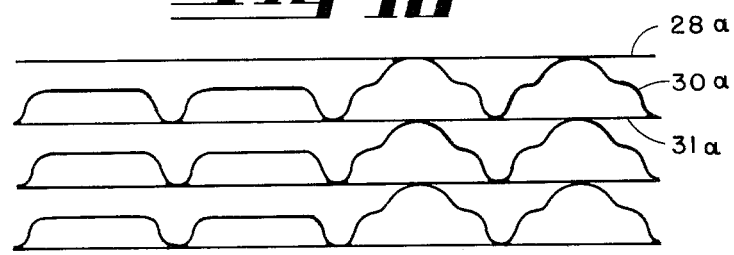

Referring to the drawings and particularly to the assembly, FIGURE 1, an annular heat exchange assembly 10 contains a series of stacked waved plate heat exchanger units 12. These units, later to be described in detail, afford primary flow passages 13, FIGURES 2 and 4, extending substantially in the radial direction relative to the annular unit, whereby exhaust enters a central cylindrical exhaust chamber 14 and passes through said radial primary flow passages 13 from the inside inlet 11 to the outside outlet of the unitary stacked heat exchanger units 12. The air to be heated by the exhaust gas, or other primary flow, enters at air inlet chambers 16 extending longitudinally on one side of each of the units 12, said inlet chambers extending longitudinally (as shown in FIGURE 1) of the annular assembly. This inlet air in the inlet chambers 16 enters at the sides of the stacked units 12 at inlet regions 19 and passes transversely through said units in secondary flow passages 17, later to be described, adjacent to said primary flow passages, and after receiving heat from the primary flow enters from outlet region 21 into an air outlet chamber 18, and from said outlet chamber 18 is fed to the combustion chamber of the engine, having absorbed heat in the heat exchange primary and secondary passages provided in the stacked unit 12, the construction and arrangement of stacked plates to accomplish such exchange being a primary feature of this invention.

FIGURE 2 shows a portion of a stacked waved plate unit 12 which is made up of retaining plates 22, 24 extending longitudinally and containing the stacked plate units, later to be described and shown generally by the reference numeral 26 in FIGURES 2 and 3. These units 26 are made up of plate pairs 28 and 30. As shown in FIGURES 2–7, inclusive, a plurality of plate pairs 26, each made up of plates such as 28, 30 formed with oppositely-disposed inwardly and outwardly projecting waves, illustrated at 32, 34 for a plate 28, and 36, 38 for a plate 30. When these pairs of plates 26 are stacked together, as shown both in FIGURES 2 and 4, as well as in FIGURE 1, the crests 38, 34 contact each other to form the primary flow channels 13 between the pair of plates of each pair 28, 30, while with adjacent pairs 26 stacked together the contact of the crests produces secondary flow channels 17 adjacent and in counterflow relation to the primary flow channels, both extending longitudinally of the plate stack with only a single metal thickness therebetween. The plate pairs 26, each made up of two plates of the form 28, 30, forms the primary flow passage and may be sealed as a unit by suitable means, such as overlapping edge flanges 29, 31 (FIGURES 3 and 4) which may be positively sealed. Thus the primary flow conduit is made up of a multiple number of longitudinal passages 13 extending between the ends of the plate pairs 26. The intervening crests of the waves in these plates are also secured together by suitable brazing or welding. These joints are between primary flow channels only and thus the quality of these intermediate joints has no relationship to possible leakage between the primary and secondary flow regions. The secondary flow channels (shown as 17 in FIGURES 4 and 5) are between the plate pairs and likewise have their projecting crests secured together, and likewise the quality of the joints in these regions does not control the division between regions of primary and secondary flow. Except for the joint completed between the overlapping edge flanges 29, 31 between plate pairs 28, 30, the separation between primary and secondary flow is accomplished by plate walls and does not depend upon joints or welds.

Referring to FIGURES 3 and 5, it is noted that on the outer surfaces of each pair adjacent the ends of the plate, the crests on the outside of the plate pairs are discontinued adjacent the end of the plates so that the greater projection of wave crest depth is between the ends of the plate centrally thereof, and when the plates are stacked together (see FIGURES 2, 3 and 7) inlets and outlets 19 and 21, respectively, are formed adjacent the end of the plate pairs for the secondary flow channels. Thus it appears also that the discontinuance of the outwardly projecting crests of that pair are deleted toward the ends, so that on successive adjacent parallel crests in the direction toward the inlet 19, as shown in FIGURE 3, the depth of the inlet region 19 is increasing toward the inlet while the discontinuance of the crests in the outlet region 21 is increasing toward the outlet. There is thus provided a region of flow from the inlet 19 transversely in a crossflow sense and thence longitudinally in a counterflow sense toward the outlet 21 in the secondary flow region and again transversely in a crossflow sense in the outlet 21 to the outlet region.

The depth of the projecting crests outwardly extending from each pair is therefore varying in depth along the length of the plate with lesser depth in the desired inlet region 19 and the desired outlet region 21 spaced therefrom, thereby leaving a central region between said inlet and outlet regions with crests of greater depth affording greater projection of crests outward from both sides of the pair of waved plates. When the plate pairs, thus formed, are stacked together, the central portions of greater depth with outwardly projecting crests thereby form the secondary flow longitudinal channels 17 and the spaced regions having wave formations of lesser depth affords noncontacting crests adjacent the inlet and outlet, thus forming the desired inlet and outlet regions which provide transverse or cross flow in those regions connecting with the longitudinally-extending counterflow channels 17.

As shown in FIGURE 2 and in the assembly view of FIGURE 1, the wave plate stack is held together by retaining plates 22, 24 and each of these plates has an inlet opening region 19 and an outlet opening region 21 which coincides with the inlet regions 19 and 21, above described, for the secondary flow. Between the plates 22, 24 in the inner exhaust region 14 (FIGURE 1) there is provided the inlet 11 (see FIGURE 2) and radially outward therefrom the outlet 15 from each primary flow channel arrangement.

The contacting crests are secured together by suitable brazing, or by resistance or electron beam welding.

In operation in the mechanism illustrated, the units 12, spaced in an annular position radially around the assembly and each with an inner inlet 11 and a radially outwardly-extending outlet 15 for primary flow, will take the hot exhaust gas entering at 14 and pass such primary flow radially of the unit through the several units 12 distributed circumferentially around the annular assembly (as shown in FIGURE 1), and the exhaust entering at the forwardly "exhaust in" inlet 14 will, on flow through the radially positioned primary flow channels 13 (longitudinally of the stacked units), furnish the heat for exchange with the secondary flow, in this case air, to be heated. This air comes into the chamber 16 and passes first into the inlet regions 19, transversely relative to primary flow, for the portion of the flow in the inlet region between the plate pairs (see FIGURES 2, 3 and 5) and will then be turned substantially 90 degrees to be distributed and flow longitudinally through the secondary flow channels 17 extending parallel to the primary flow channels carrying the heated gas. The secondary flow, in this case air, will then continue its flow to the outlet region 21 and out the outlet 21 into the adjacent flow channel 18 on the opposite side of the stacked unit and this flow will carry the heated air to the combustion section of the engine.

It is noted that it is an important advantage of the structure that the heat exchange unit is made up of a series of stacked plates having only limited variations in design (two variations in the example shown), namely, the plates of the form 28 and 30, which when stacked together in pairs 26, as shown, provide primary flow passages therebetween. A plurality of these pairs 26 are then stacked with the outer crests and channels of the waves on these pairs forming, when stacked, the secondary flow channels, as well as inlet and outlets for secondary flow, the entire stacked unit accomplishing a compact and efficient heat transfer assembly.

The preferred form of the invention provides a structure wherein two shapes of plates can be paired in such a way as to accomplish a structure with counterflow channels very close together with one thickness of wall between the primary and secondary flow and providing crests which may be varied in depth adjacent the ends, as has been described, to accomplish inlet and outlet for the secondary flow while the primary flow extends through, as has been described. FIGURES 8 to 11, inclusive, show certain modified forms of the invention which may be employed. Although these modified forms do not provide certain of the advantages of the preferred form, they are, however, disclosed here as showing other means of accomplishing certain of the functions of the invention. The preferred form, as well as the modified forms, might be broadly described by selecting a waved plate, such as, for instance, plate 30 of FIGURE 4, having oppositely projecting crests alternately disposed inwardly on one side of each waved plate and outwardly on the opposite side, thereby forming a series of separate adjacent counterflow channels for carrying primary flow in one series of such channels and secondary counterflow in an alternate series of adjacent channels. Alternate channels are thus formed on opposite sides of a waved plate, or what might be termed a corrugated plate. This plate might have these adjacent counterflow channels completed by adjacent plates one on each side of the waved plate, such as 28, contacting oppositely projecting crests and forming walls completing said channels for separate primary and secondary counter flow. Such completing walls might have varying forms, for instance, in the showing of FIGURE 4 the completing plates might be adjacent plates 28 and 31 on opposite sides of the plate 30, while in FIGURE 11 the plates 28a and 31a might be considered as completing the channels in waved plate 30a. Likewise, in FIGURE 8, plates 28b and 31b complete channels in 30b; in FIGURE 9, plates 28c and 31c complete channels in 30c; and in FIGURE 10, plates 28d and 31d complete channels in 30d.

It is also a general description which would serve for the several modifications that certain of the projecting crests on the waved plates, such as 30, for instance, or similar numbers on the other modifications, have a wave formation of varying depth adjacent the ends of the plates affording a crossflow inlet region and a crossflow outlet region connecting said inlet and said outlet by a cross flow to the secondary counterflow channels.

In the modified form of the invention shown in FIGURES 12 and 13, the annular exhaust region 14a, surrounded by cylindrical walls 50, 52, carry longitudinally-extending stacked plates of the general structure, previously described, but in this case the stacked plates form an annular stack with the provision for a straight-through passage of exhaust gas from an inlet region 11a through primary flow passages 13a, longitudinally extending to a rear exhaust outlet region 12a. These numbers, above indicated, compare with the inlet 11 and the outlet 12 of the primary flow shown in the preferred form of this invention, but it is noted that in this case the primary flow, or exhaust flow, is straight through from front to rear of the annular stacked plates, while the annular compressed air inlet area 19aa extends to the rear of the plate stack and enters the inlet 19a of the stacked plates at the rear thereof, extending in crossflow relationship to counterflow passages 17a of the same general configuration as is shown in the preferred form of the invention, to crossflow 21a, the flow having continued in counterflow direction through secondary flow passages 17a. The outlet 21a for heated air, therefore, is into annular region 21aa, which is the return duct to the combustion chamber of the engine. It is noted that this arrangement provides for an annular stack of heat transfer plates with the advantage of straight-through front to rear exhaust gas passage from the inlet 11a to the outlet 12a, as previously described.

Although the invention has been described by reference to an illustrative structure found practical in actual operation, it is nevertheless intended that various other modifications be made within the scope of the following claims.

We claim:

1. A corrugated plate heat exchanger made up of a series of stacked corrugated plates having substantially parallel wave formations with oppositely disposed inwardly and outwardly projecting alternate crests on adjacent wave forms;

a plurality of pairs of said stacked plates, each pair of said plates positioned together with inwardly projecting wave crests contacting, each plate of a pair having a wave formation distinguished from the other plate, thereby to form longitudinally extending primary flow passages between such plates of each pair extending from an inlet at one end to an outlet at the opposite end of said stacked series of plates;

such pairs of plates each having their outwardly projecting crests omitted in a desired secondary flow inlet region and in a desired secondary flow outlet region spaced therefrom on the opposite longitudinal side and adjacent the opposite end of said stacked plates but such crests not omitted in said primary flow region, thereby leaving a central region between said inlet and said outlet regions with projections of crests outward from both sides of each plate of said pair of plates;

said regions of omitted crests in said secondary flow regions of inlet and outlet located for heat exchange with said primary flow passages through a single plate thickness and receiving support, continuing in said regions, afforded by said contacting oppositely projecting continuing wave crests on the opposite side of said plates forming said primary flow passages thereby to maintain spacing of said plates against high pressure of secondary flow;

means for stacking said pairs of plates with said projecting crest regions contacting each other, thereby to form counter longitudinal secondary flow of passages longitudinally counter to said primary flow passages and with a transverse flow inlet and a transverse flow outlet formed for said secondary flow by said spaced inlet and outlet regions positioned for uniformity of positive heat transfer from primary to secondary flow passages through a single plate thickness.

2. A corrugated plate heat exchanger as set forth in claim 1, having said secondary flow inlets on the opposite side of said stacked plates from said secondary flow outlets and having retaining plates for said stacked series of plates positioned on opposite sides of said stack with one of said plates having an inlet opening region therein, coinciding with the said secondary flow inlets and said plate on the opposite side of said stack having an outlet opening region therein adjacent the said outlets from said stack;

said retaining plates having open spaces therebetween affording primary flow inlet and outlet from the bottom and top of said stack respectively.

3. A corrugated plate heat exchanger made up of a series of stacked corrugated plates having substantially parallel wave formations with oppositely disposed inwardly and outwardly projecting alternate crests on adjacent wave forms;

a plurality of pairs of said stacked plates, each pair of said plates positioned together with inwardly projecting wave crests contacting, each plate of a pair having a wave formation distinguished from the other plate, thereby to form longitudinally extending primary flow passages between such plates of each pair extending from an inlet at one end to an outlet at the opposite end of said stacked series of plates;

such pairs of plates each having their outwardly projecting crests omitted in a desired secondary flow inlet region and in a desired secondary flow outlet region spaced therefrom on the opposite longitudinal side and adjacent the opposite end of said stacked plates but such crests not omitted in said primary flow region, thereby leaving a central region between said inlet and said outlet regions with projections of crests outward from both sides of each plate of said pair of plates;

said regions of omitted crests in secondary flow regions of inlet and outlet located for heat exchange with said primary flow passages through a single plate thickness and receiving support, continuing in said regions, afforded by said contacting oppositely projecting continuing wave crests on the opposite side of said plates forming said primary flow passages thereby to maintain spacing of said plates against high pressure of secondary flow;

means for stacking said pairs of plates with said projecting crest regions contacting each other, thereby to form counter longitudinal secondary flow in passages longitudinally counter to said primary flow passages and with a transverse flow inlet and a transverse flow outlet formed for said secondary flow by said spaced inlet and outlet regions positioned for uniformity of positive heat transfer from primary to secondary flow passages through a single plate thickness;

projecting portions on each plate of such pair located at the edges of said plates and extending toward the opposite plate and substantially parallel to said primary flow passages;

means providing a seal at said edges, thereby to provide a series of primary flow passages between said plates with positive containment of said primary flow between said plates with the provision of longitudinally extending flow passages made up by said inwardly contacting wave crests without necessity for primary reliance upon said contacting wave crests for containing primary flow from said secondary flow passages.

4. A plate type heat exchanger made up of a plurality of stacked plates;

certain of said plates being corrugated plates having substantially parallel wave formation;

oppositely projecting crests of said wave formations alternately disposed inwardly on one side of each plate and outwardly on the opposite side, thereby forming a series of separate adjacent counter flow channels for carrying primary flow in one series of such channels and a secondary counter flow in an alternate series of adjacent channels;

adjacent plates one on each side of certain of said waved plates contacting said oppositely projecting crests and forming walls completing said channels for separate primary and secondary counter flow;

certain of the projecting wave crests omitted in a desired secondary flow inlet region and in a desired secondary outlet region spaced therefrom and adjacent the opposite end of said stacked plates affording a cross flow inlet region connecting with said secondary counter flow channels but such crests not omitted in said primary flow region;

said regions of omitted crests on said plates in said secondary flow regions of inlet and outlet located for heat exchange with said primary flow passages through a single plate thickness and receiving support, continuing in said regions, afforded by said contacting oppositely projecting continuing wave crests on the opposite side of said plates forming said primary flow passages, thereby to maintain spacing of said plates against high pressure of secondary flow;

means for stacking said plates with said projecting crest regions contacting each other, thereby to form counter longitudinal secondary flow in passages longitudinal counter to said primary flow passages and with a transverse flow inlet and a transverse flow outlet formed for said secondary flow by said spaced inlet and outlet regions positioned for uniformity of positive heat transfer from primary to secondary flow passages through a single plate thickness.

5. A heat exchanger constructed as defined in claim 4 but employing radially spaced concentric cylindrical walls forming an annular exhaust region;

said plurality of stacked plates positioned radially in said annular exhaust region with said primary flow channels extending longitudinally through said stack from an outlet region in the forward portion of an exhaust region to an outlet in the rearward portion of said exhaust region;

further means providing an inlet region for said secondary flow at one end of said annular stack at the outer periphery thereof and further means providing an outlet region from said annular stack in the outer periphery adjacent the opposite end of said stack.

References Cited by the Examiner

UNITED STATES PATENTS

| | | | |
|---|---|---|---|
| 2,093,968 | 9/1937 | Kettering | 165—166 |
| 2,368,732 | 2/1945 | Wallgren | 165—167 |
| 2,566,310 | 9/1951 | Burns et al. | 165—167 |
| 3,111,982 | 11/1963 | Ulbricht | 165—166 |

FOREIGN PATENTS

| | | |
|---|---|---|
| 176,221 | 3/1953 | Austria. |
| 655,470 | 7/1951 | Great Britain. |

ROBERT A. O'LEARY, *Primary Examiner.*

CHARLES SUKALO, *Examiner.*